Patented Dec. 21, 1943

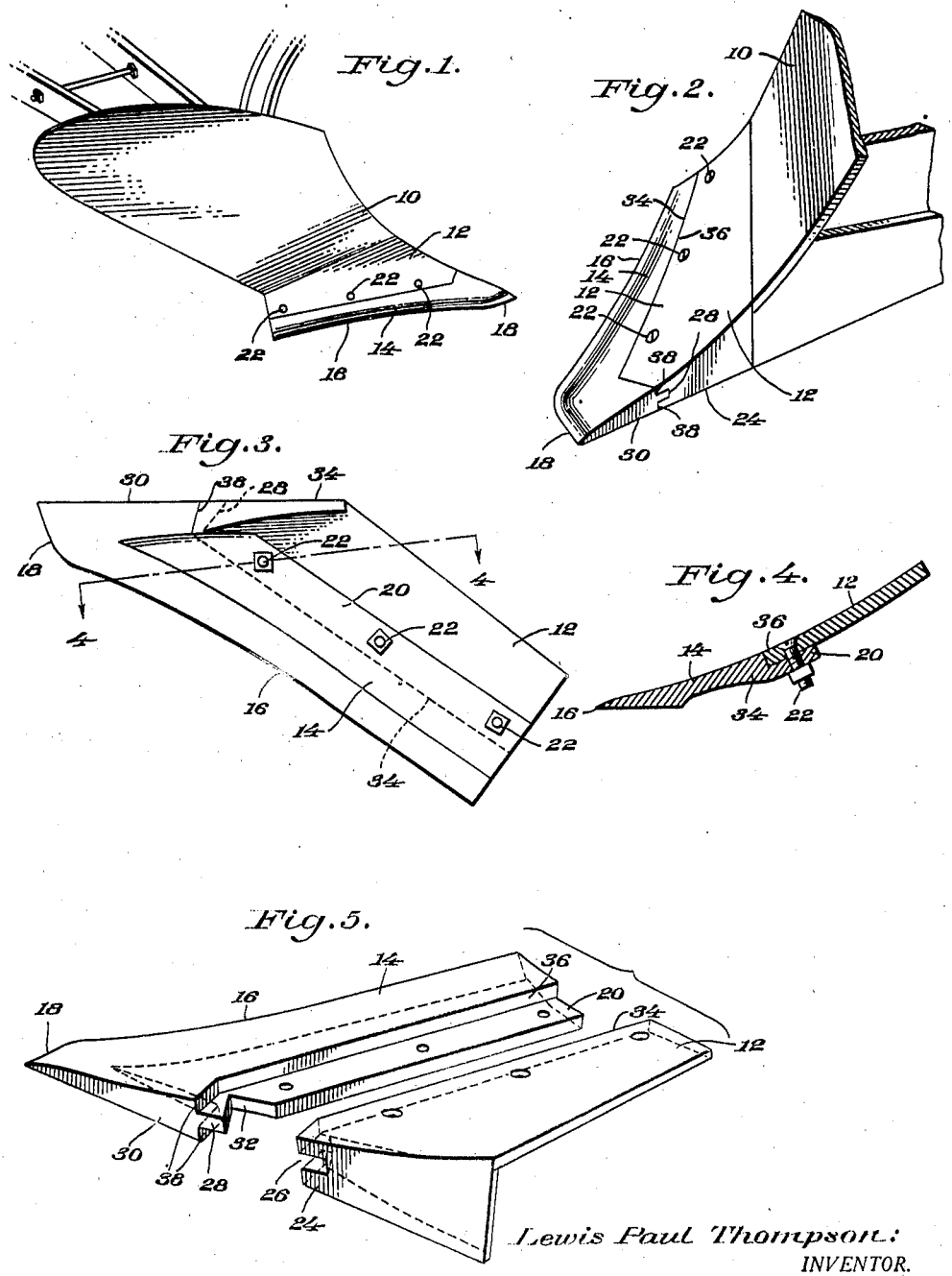

2,337,136

UNITED STATES PATENT OFFICE 2,337,136

SECTIONAL PLOWSHARE

Lewis Paul Thompson, Coffey, Mo.

Application September 16, 1941, Serial No. 411,070

1 Claim. (Cl. 97—125)

My invention relates to plows, particularly the plowshare thereof, and has among its objects and advantages the provision of an improved plowshare construction wherein a removable shearing blade is provided. The blade and the plowshare portion to which it is connected are so constructed as to provide a sturdy mount for the blade, in which the blade may be easily and quickly removed from or attached to the plowshare portion, and in which the blade is so designed as to permit discarding thereof after becoming dull without prohibitive cost in distinction to the inconvenience and expense incident to sharpening conventional plowshares.

In the accompanying drawing:

Figure 1 is a perspective view of a plow embodying the invention;

Figure 2 is a perspective view illustrating the land slide face of the invention;

Figure 3 is a bottom plan view of the shearing blade and the plowshare portion to which it is attached;

Figure 4 is a sectional view along the line 4—4 of Figure 3; and

Figure 5 is a perspective view illustrating the shearing blade and the plowshare part detached one from the other.

In the embodiment selected for illustration, I make use of the usual moldboard unit 10 to which the plowshare section 12 is secured in the conventional manner. The shearing blade 14 is keyed and bolted to the plowshare section 12. Referring to Figure 5, the shearing blade 14 includes a cutting edge 16 and a point 18 of the same construction as the ordinary plowshare. Along the rear edge of the plowshare section 12 is a flange 20 overlapping underneath the forward edge margin of the plowshare section 12. The two parts are fixedly secured by countersunk bolts 22.

The landside body 24 of the plowshare section 12 is provided with a groove 26 into which a key 28 on the land slide body 30 of the shearing blade is receivable. Key 28 constitutes a continuation of the flange 20, the flange being provided with a generally V-shaped notch 32 into which is fitted the correspondingly shaped notched portion of the landside body 24.

The forward edge 34 of the plowshare section 12 abuts the shoulder 36 on the shearing blade 14. Two shoulders 38 are fastened on the rear end of the land slide body 30 for engagement with the forward end of the landside body 24. Both shoulders 38 lie at an obtuse angle with respect to the shoulder 36, and the forward end of the landside body 24 is of corresponding angularity so as to fit snugly against the two shoulders.

Because of the notch 32 and the arrangement of the shoulders 38 with respect to the shoulder 36, the shearing blade 14 is effectively supported against relative longitudinal shifting with respect to the plowshare section 12. In addition, the bolt holes in the respective plowshare section 12 and the shearing blade 14 will always align when the shearing blade is fitted snugly into position against the plowshare section 12. Furthermore, the key 28 accurately aligns the upper face of the shearing blade with the upper face of the plowshare section 12 so as to eliminate offset relationship along the meeting line between the edge 34 and the shoulder 36. Thus the overlapping and interfitting contours of the shearing blade 14 and the plowshare section 12 cooperate with the bolts 22 to firmly and accurately secure and support the two parts in connected relationship as well as alignment.

Shearing blade 14 is relatively narrow and may be discarded after first becoming dull, thereby eliminating the necessity of resharpening. A new shearing blade may be substituted for the discarded blade, thereby eliminating the inconvenience and time lost incident to changing and sharpening conventional plowshares. The plowshare section 12 and the shearing blade 14 provide a unit corresponding to the conventional plowshare with respect to shape, size and function, with the rear structure of the plowshare section 12 designed to fit conventional plows.

Without further elaboration, the foregoing will so fully illustrate my invention, that others may, by applying current knowledge, readily adapt the same for use under various conditions of service.

I claim:

A sectional plowshare comprising a share section having a landside body provided with a groove in its forward end, a shearing blade having a shoulder engaging the forward edge of said share section and the forward end of said landside body and having a flange underlying the share section, said groove lying in the plane of said flange, said flange being provided with a notch and said groove having a bottom formation contoured to fit snugly in the notch, with said flange fitting snugly in the groove, and bolt means connecting said flange with said share section.

LEWIS PAUL THOMPSON.